United States Patent Office 3,761,471
Patented Sept. 25, 1973

3,761,471
BENZALACETONE OR ACETOPHENONE AMIDINOHYDRAZONE DERIVATIVES AND THE PRODUCTION THEREOF
Tamio Nishimura, Tokyo, Shin Yoshii, Kawasaki, Hiroshige Toku, Tokorozawa, and Bunzo Nomiya, Tokyo, Japan, assignors to Tamio Nishimura, Tokyo, Japan
No Drawing. Filed Aug. 17, 1971, Ser. No. 172,598
Claims priority, application Japan, Nov. 16, 1970, 45/100,214, 45/100,215, 45/100,216
Int. Cl. C07c 133/00
U.S. Cl. 260—240 F          1 Claim

ABSTRACT OF THE DISCLOSURE

A benzalacetone or acetophenone amidinohydrazone derivative of the general formula:

$$Y-\underset{CH_3}{C}=N-NH-\underset{Z}{C}=NH$$

wherein Y is a group

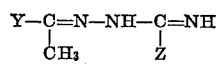

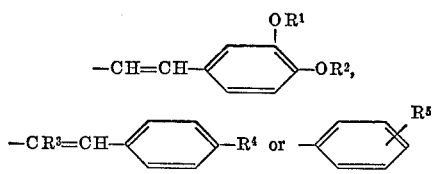

in which $R^1$ and $R^2$ are each a hydrogen atom or an alkyl group of 1–12 carbon atoms, $R^3$ is a hydrogen atom or a methyl group and $R^4$ is a hydrogen atom or a nitro, hydroxyl or an alkoxyl group of 1–16 carbon atoms, $R^5$ is a hydrogen atom, a nitro or an alkoxyl group of 1–16 carbon atoms; and Z is an amino, N,N-tetramethyleneamino, N,N-pentamethyleneamino or N,N-anhydro-bis-(2-hydroxyethyl)-amino group are produced as new compounds which are useful as anti-viral agent particularly effective against influenza viruses.

---

This invention relates to new and useful compounds which are benzalacetone or acetophenone amidinohydrazone derivatives and which are effective as antiviral agent and useful in the treatment of influenza. This invention further relates to a process for the production of these new and useful benzalacetone and acetophenone amidinohydrazone derivatives.

It is known that influenza is caused by the infection of influenza viruses. It has extensively been attempted to synthesize a new compound which is effective as antiviral agent and especially useful in chemotherapeutic treatment of influenza. An object of this invention is to provide new and useful compounds which are effective and useful as an antiviral agent for chemo-prophylaxis and chemo-therapeutic treatment of influenza.

We have now succeeded in synthesizing benzalacetone amidinohydrazone derivatives and acetophenone amidinohydrazone derivatives as new compounds, and we have found that these new compounds are effective as antiviral agent and useful for chemo-prophylaxis and chemo-therapeutic treatment of influenza.

According to an aspect of the present invention, therefore, there is provided as new compound a benzalacetone or acetophenone amidinohydrazone derivative of the general formula:

$$Y-\underset{CH_3}{C}=N-NH-\underset{Z}{C}=NH \quad (I)$$

wherein Y is a group

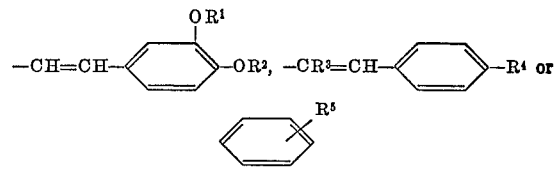

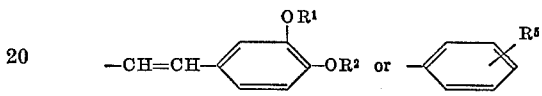

in which $R^1$ and $R^2$ are each a hydrogen atom or an alkyl group of 1–12 carbon atoms, $R^3$ is a hydrogen atom or a methyl group and $R^4$ is a hydrogen atom or a nitro, hydroxyl or an alkoxyl group of 1–16 carbon atoms, and $R^5$ is a hydrogen atom, a nitro or an alkoxyl group of 1–16 carbon atoms; and Z is an amino, N,N-tetramethyleneamino, N,N-pentamethyleneamino or N,N-anhydro-bis-(2-hydroxyethyl) - amino group; provided that when Z is an amino group, Y is a group

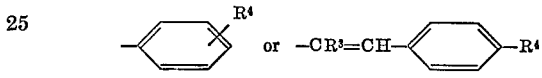

provided that when Z is an N,N-tetramethyleneamino group, Y is a group

and provided that when Z is an N,N-pentamethyleneamino or N,N-anhydro-bis-(2 - hydroxyethyl) - amino group, Y is a group

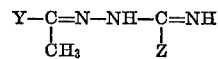

and an acid-addition salt thereof.

Referring to the General Formula I, $R^1$ and $R^2$ may be an alkyl group of 1–12 carbon atoms such as methyl, ethyl, propyl, n-butyl, n-pentyl, n-heptyl, n-hexyl, n-octyl, n-decyl and n-dodecyl, namely lauryl. $R^4$ and $R^5$ may be an alkoxyl group of 1–16 carbon atoms such as methoxy, ethoxy, propoxy, n-butoxy, n-pentyloxy, n-heptyloxy, n-hexadecyloxy. When $R^1$, $R^2$, $R^4$ and $R^5$ are an alkyl or hexyloxy, n-octyloxy, n-decyloxy, n-dodecyloxy and n-alkoxyl group, the group may preferably be of straight chain but it may be branched, if desired.

According to a first embodiment of the present invention, there is provided a benzalacetone amidinohydrazone derivative of the formula:

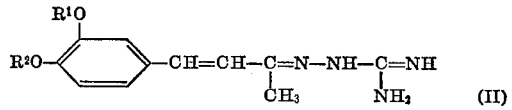
(II)

in which $R^1$ and $R^2$ are each a hydrogen atom or an alkyl group of 1–12 carbon atoms, and $R^1$ and $R^2$ may be the same or different, and an acid-addition salt thereof. The benzalacetone amidinohydrazone derivative of the above Formula II may be produced by reacting a substituted benzalacetone of of the formula:

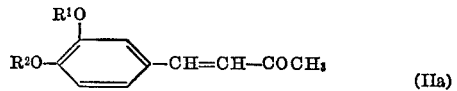
(IIa)

wherein $R^1$ and $R^2$ are as defined above with aminoguanidine, that is, simple amidinohydrazine of the formula:

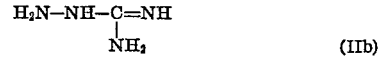
(IIb)

or an acid-addition salt thereof in a suitable organic solvent with liberation of water and preferably in the presence of an appropriate condensation catalyst such as concentrated hydrochloric acid and with application of heat, According to a further embodiment of the present invention, there is provided a benzalacetone amidinohydrazone derivative of the formula:

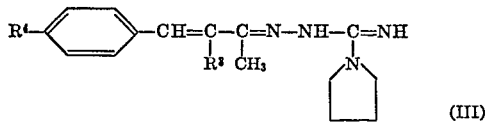

in which $R^4$ is a hydrogen atom, a nitro, hydroxyl or an alkoxyl group of 1–16 carbon atoms, and $R^3$ is a hydrogen atom or a methyl group, and an acid-addition salt thereof. The benzalacetone amidino-hydrazone derivative of the above Formula III may be produced by reacting a p-substituted benzalacetone or p-substituted α-methyl-benzalacetone of the formula:

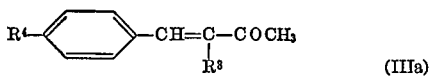

wherein $R^3$ and $R^4$ are as defined above, with $N^1,N^1$-tetramethylene-amidinohydrazine of the formula:

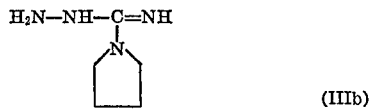

or an acid-addition salt thereof in a suitable organic solvent with liberation of water and preferably in the presence of an appropriate condensation catalyst such as concentrated hydrochloric acid and with application of heat.

According to another embodiment of the present invention, there is provided an acetophenone amidinohydrazone derivative of the formula:

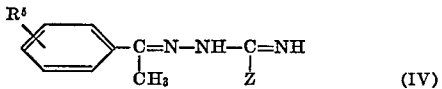

wherein $R^5$ is a hydrogen atom, a nitro or an alkoxyl group of 1–16 carbon atoms, and Z is an amino, N,N-tetramethyleneamino, N,N-pentamethyleneamino or N,N-anhydrobis(2-hydroxyethyl)-amino group, and an acid-addition salt thereof. The acetophenone amidinohydrazone derivative of the above Formula IV may be produced by reacting an acetophenone compound of the formula:

wherein $R^5$ is as defined above, with an unsubstituted or substituted amidinohydrazine of the formula:

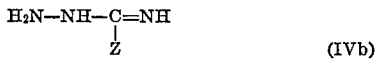

wherein Z is as defined above, or an acid-addition salt thereof, in a suitable organic solvent with liberation of water and preferably in the presence of an appropriate condensation catalyst such as hydrochloric acid and with application of heat.

In general, therefore there is provided according to a second aspect of the present invention a process for the production of benzalacetone or acetophenone amidinohydrazone derivative of the general formula:

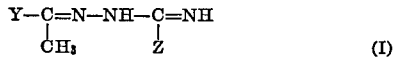

wherein Y and Z have the same meanings as defined above, and an acid-addition salt thereof, which comprises reacting a substituted acetone of the general formula:

wherein Y has the same meaning as defined above, with a unsubstituted or substituted amidinohydrazine of the general formula:

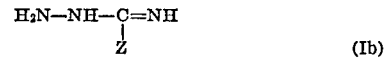

wherein Z has the same meaning as defined above, or an acid-addition salt thereof in a known manner with liberation of water formed due to the condensation reaction, and then, if desired, converting the resultant condensation product into an acid-addition salt or into the free base form thereof in a known manner.

In carrying out the condensation reaction for the production of the benzalacetone or acetophenone amidinohydrazone derivatives according to the present invention, it is suitable to react the benzalacetone or acetophenone starting material of the Formula Ia, more particularly IIa, IIIa or IVa with the amidinohydrazine reactant of the Formula Ib, more particularly IIb, IIIb or IVb in equi-molar or substantially equi-molar proportions, respectively. If desired, it is possible to use either one of the reactants in an excess, though the use of an excess of one reactant does not substantially improve the yield of the final product. The reaction may conveniently be carried out in a solution of the reactants in a lower aliphatic alcohol such as methanol, ethanol, propanol, butanol, etc., which may contain a minor amount of water but may preferably be anhydrous. There may be employed other organic solvents for the reactants, such as, for example, chloroform, benzene as long as they are inert to the reaction. The reaction may proceed at room temperature. In order to promote the reaction, however, it is preferable that the reaction should be effected at an elevated temperature of up to a boiling or refluxing temperature of a solvent employed under atmospheric pressure. To this end, the reaction mixture may suitably be heated on water bath or steam bath. In order to promote the reaction, it is also preferable to provide in the reaction mixture the presence of an appropriate dehydration condensation catalyst such as an inorganic acid, for example, concentrated hydrochloric acid, sulfuric acid, etc. When the reaction is carried out at a refluxing temperature of a solvent such as methanol and ethanol and in the presence of a catalytic amount of concentrated hydrochloric acid, a reaction time of 30 minutes to 1 hour is normally sufficient to complete the condensation reaction of the reactants. After the completion of the reaction, the reaction mixture may be cooled down to promote the deposition of or to deposit the condensation product of the Formula I, more particularly II, III or IV formed, which may then be filtered out for the recovery thereof. The reaction mixture may also be distilled at atmospheric or reduced pressure to remove the solvent so that the precipitation of the condensation product formed is facilitated.

In carrying out the condensation reaction according to the present invention, it is feasible to use the amidinohydrazine reactant of the Formula Ib, IIb, IIIb or IVb in the form of its acid-addition salt with an inorganic acid, such as hydrochloride, hydrobromide, hydroiodide, sulfate or nitrate etc., or its acid-addition salt with an organic acid, such as acetate. When the amidinohydrazine reactant is employed in the form of its acid-addition salt, and/or when the acid condensation catalyst is used, all or a part of the desired condensation product of the Formula I, II, III or IV is produced in the form of the corresponding acid-addition salt. The condensation product in the form of its acid-addition salt may readily be converted into the free base form of the benzalacetone or acetophenone amidinohydrazone derivative by treating with an alkali in a known manner, if desired. When the amidinohydrazine reactant is neither used in the form of its acid-addition salt nor the acid condensation catalyst is present in the reaction mixture, the condensation product is then, of course, produced in the free base form of the benzalacetone or acetophenone amidinohydrazone derivative of the Formula I, II, III or IV. When the benzalacetone or acetophenone amidinohydrazone derivative has been obtained in the form of the free base, it may subsequently be converted into its acid-addition salt such as hydrochloride, hydrobromide, hydroiodide sulfate, nitrate and acetate, etc., if desired, by treating with the necessary inorganic or organic acid in a known manner.

A crude condensation product obtained from the process of the present invention may be purified by recrystallisation from a suitable organic solvent such as methanol and ethanol.

The substituted benzalacetone of the Formula IIa which is used as a starting material for the first embodiment of the process may be prepared in the following manner: Thus, vanilline, namely p-hydroxy - m - methoxybenzaldehyde is condensed with acetone at room temperature in the presence of an alkali such as sodium hydroxide to give 4-hydroxy-3-methoxybenzal acetone. Alternatively, vanilline is reacted with pyridine in dichloromethane in the presence of aluminum chloride, and the resulting reaction product is then hydrolysed to give 3,4-dihydroxybenzaldehyde which is subsequently condensed with acetone in the presence of an alkali in a similar way to produce 3,4-dihydroxy-benzal-acetone. The 4-hydroxy-3-methoxybenzalacetone and 3,4-dihydroxybenzalacetone so obtained may be converted into the disodium salt by treating with sodium hydroxide in solution in ethanol. The sodium salt may subsequently be treated with n-alkyl bromide to give the corresponding 3,4-dialkoxybenzalacetone which may be represented by the above Formula IIa.

The p-substituted benzalacetone or p-substituted α-methyl-benzalacetone of the Formula IIIa which is used as a starting material for the second embodiment of the process of the present invention may be prepared by condensing a correspondingly substituted benzaldehyde with acetone or methyl ethyl ketone under an alkaline condition and with liberation of water. However, p-alkoxy-substituted benzalacetones of the Formula IIIa may be prepared according to Williamson synthesis starting from the corresponding p-hydroxy-benzalacetones. $N^1,N^1$-tetramethylene amidinohydrazine which is used as a reactant is of the following formula:

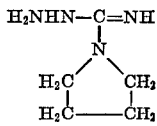

and an acid-addition salt thereof may be prepared at favorable yield by reacting S-methyl-isothiosemicarbazide hydroiodide with pyrrolidine (see a Japanese publication titled "Yu-u-ki Gosei Kagaku" vol. 28, page 240, 1970).

Among acetophenone compounds as shown by the Formula IVa which are used as the starting material for the third embodiment of the process of the present invention, the p-alkoxyacetophenone compound in which the substituent $R^5$ is an alkoxy group situated at the para-position may be prepared by reacting p-hydroxy-acetophenone with an alkyl bromide according to Williamson synthesis. The m-alkoxyacetophenone compound may be prepared by nitrating acetophenone in a known manner, subsequently reducing the nitration product into the amino derivative, diazotising this amino compound, and then heating the diazo product to give m-hydroxy-acetophenone which may subsequently be converted into the m-alkoxyacetophenone by treating with an alkyl bromide according to the Williamson synthesis. Futhermore, the o-alkoxyacetophenone compound may be prepared by subjecting phenyl acetate to Fries rearrangement to give o-hydroxyacetophenone which may subsequently be converted into the o-alkoxyacetophenone similarly by treating with an alkyl bromide according to Williamson synthesis. Referring to the acetophenone compound of the Formula IVa, it may be appreciated that the substituent $R^5$ may be not only an alkoxyl group but also may be a nitro group and that the substituent $R^5$ may optionally situate at any of the o-, m- and p-positions of the benzene nucleus of the acetophenone.

The benzalacetone or acetophenone amidinohydrazone derivatives of the present invention have an antiviral activity against viruses and especially against influenza viruses, though they have other various pharmacological activities. Furthermore, the amidinohydrazone derivatives of the present invention show a low acute toxicity of $LD_{50}$ of 2000 mg. to 2500 mg./kg., as determined by oral administration in mice. It has been found that the amidinohydrazone derivatives of the present invention show marked chemo-therapeutic effect in the treatment of mice infected by influenza viruses and hence they are useful as chemo-prophylactic medicine and chemotherapeutic agent for the influenza infections of man and animals.

The amidinohydrazone derivatives of the present invention may be administered in various ways, for example orally, intravenously, intra-rectally intranarially and intra-ocularly. Thus, the amidinohydrazone derivatives of the present invention may be formulated in various forms such as injectable solution, suspension, powder, tablet, pill, capsule, pellet, syrup, suppository and such a pulverised sterile formulation which may instantly be dissolved in sterile water to give a injectable solution immediately before use. In the solid formulations, any known pharmaceutical carrier such as lactose and a known lubricating agent such as magnesium stearate may be mixed with the active amidinohydrazone derivative of the present invention as far as they are compatible with each other. For therapeutic treatment of influenza infection of adult man, effective dosage of an amidinohydrazone derivative of the present invention depends on the way of administration thereof, but it has been found appropriate to administer a dose of 25–100 mg. to the infected adult to a total dosage of 50–200 mg. per day.

Among the amidinohydrazone derivatives of the present invention, the following specific compounds may be mentioned in particular:

Para-decyloxybenzalacetones amidinohydrazone and its hydrochloride.
3 - methoxy-4-decyloxybenzalacetone amidinohydrazone and its hydrochloride.
Metha-dodecyloxybenzalacetone amidinohydrazone and its hydrochloride.
3 - methoxy-4-n-octyloxybenzalacetone amidinohydrazone and its hydrochloride.
3-methoxy-4-n-lauryloxybenzalacetone amidinohydrazone and its hydrochloride.
Para-n-octyloxybenzalacetone $N^1,N^1$ - tetramethyleneamidinohyrazone and its hydrochloride.
Para-n-decyloxybenzalacetone $N^1,N^1$ - tetramethyleneamidinohydrazone and its hydrochloride.
Para-n-octyloxyacetophenone amidinohydrazone and its hydrochloride.
Para-n-decyloxyacetophenone amidinohydrazone and its hydrochloride.
Metha-n-heptyloxyacetophenone amidinohydrazone and its hydrochloride.
Metha-n-octyloxyacetophenone amidinohydrazone and its hydrochloride.
Metha-n-decyloxyacetophenone amidinohydrazone and its hydrochloride.
Metha-n-dodecyloxyacetophenone amidinohydrazone and its hydrochloride.

We have tested the antiviral properties of the undermentioned illustrative amidinohydrazone derivatives of the present invention.

(A) TESTS OF INACTIVATION OF VIRUS

Each of test compounds was dissolved in 4 ml. of distilled water and then serially diluted with Hanks' balanced salt solution to give test solutions containing designated concentrations of the test compound. To 0.7 ml. of each test solution was added an equal volume of an aqueous suspension of influenza virus $A_2$, Adachi strain in Hanks' salt solution (infectivity titer: 100 $MID_{100}$/0.1 ml.). The term "MID" means Membrane Infective Dose. The mixture was shaken and then allowed to stand for 30 minutes at room temperature. On the other hand, there were prepared tubes each containing 0.8 ml. of Hanks' balanced salt solution to which one piece of the chlorioallantoic membrane of 11-day-old embryonated chick eggs and one piece of egg shell had been added. The abovementioned mixture (0.2 ml.) was added into each incubation tube for infection. The incubation was effected at 36° C. for 48 hours, and thereafter all the tubes were checked. As the virus-inactivating concentration of the test compound was estimated the minimum drug concentration of the test compound at and above which the virus cultures showed negative reaction to hemagglutination. Test results obtained are shown in Table 1 with respect to a class of test compounds represented by the formula:

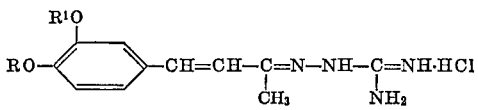

TABLE 1

| R | $R^1$ | Concentration of inactivation of virus (mcg./ml.) |
| --- | --- | --- |
| H | $CH_3$ | 69 |
| $C_8H_{17}$ | $CH_3$ | 6 |
| $C_{10}H_{21}$ | $CH_3$ | 2.5 |
| $C_{12}H_{25}$ | $CH_3$ | 2.79 |

Test results obtained are shown in Table 2 with respect to a further class of test compounds represented by the formula:

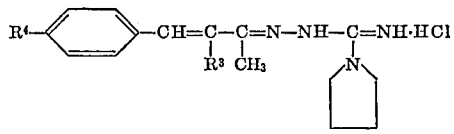

TABLE 2

| $R^4$ | $R^3$ | Concentration of inactivation of virus (mcg./ml.) |
| --- | --- | --- |
| n-$C_6H_{13}O$ | H | 70 |
| n-$C_7H_{15}O$ | H | 83 |
| n-$C_8H_{17}O$ | H | 5 |
| n-$C_{10}H_{21}O$ | H | 7 |
| n-$C_{12}H_{25}O$ | H | 25 |
| n-$C_8H_{17}O$ | $CH_3$ | 40.5 |
| n-$C_{10}H_{21}O$ | $CH_3$ | 21.5 |

Test results obtained are shown in Table 3 with respect to another class of test compounds represented by the formula:

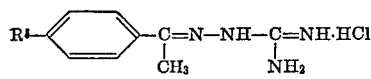

TABLE 3

| $R^5$: | Concentration of inactivation of virus (mcg./ml.) |
| --- | --- |
| n—$C_5H_{11}O$ | 70 |
| n—$C_6H_{13}O$ | 55 |
| n—$C_7H_{15}O$ | 16 |
| n—$C_8H_{17}O$ | 11 |
| n—$C_{10}H_{21}O$ | 2 |

Test results obtained are shown in Table 4 with respect to a yet another class of test compounds represented by the formula:

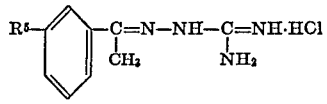

TABLE 4

| $R^5$: | Concentration of inactivation of virus (mcg./ml.) |
| --- | --- |
| n—$C_4H_9O$ | 53 |
| n—$C_5H_{11}O$ | 58 |
| n—$C_6H_{13}O$ | 37 |
| n—$C_7H_{15}O$ | 15 |
| n—$C_8H_{17}O$ | 11 |
| n—$C_{10}H_{21}O$ | 7 |
| n—$C_{12}H_{25}O$ | 9 |

(B) TEST OF SUPPRESSION OF THE VIRUS MULTIPLICATION

A cell stock of influenza virus (PR8) which had been freeze-stored at $-70°$ C. was diluted to 10 $EID_{50}$ using Earle's balanced salt solution to which lactoalubumin had been added, and the resulting virus suspension was inoculated allantoically in an amount of 0.1 ml. per egg to 10-day-old embryonated chick eggs. Ten embryonated eggs in each group were used for each determination. After the infection of virus, a solution of a test compound in methanol-water was put into the infected eggs at various dosages and the incubation was effected for 48 hours. Hemagglutination units were then determined and expressed in terms of percent of the controls. Percent values so obtained are expressed as suppression (percent) of virus multiplication. The dosages of the test compound were adjusted to be less than such a level that 100% survival of the infected eggs could be observed when the infected eggs were incubated for 24 hours after the administration of those dosages of the test compound.

Test results obtained are shown in Table 5 with respect to the class of the test compounds represented by the formula:

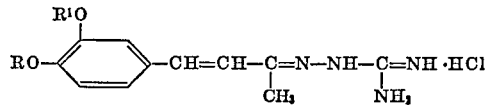

TABLE 5

| R | $R_1$ | Dosage (mcg./egg) | Virus dilution ($EID_{50}$:$10^{-8}$) | Suppression (percent) of virus multiplication |
| --- | --- | --- | --- | --- |
| $C_{10}H_{21}$ | $CH_3$ | 500 | $10^{-7}$ | 99.6 |
|  |  | 250 | $10^{-7}$ | 95.5 |
|  |  | 125 | $10^{-7}$ | 91.3 |
|  |  | 62.5 | $10^{-7}$ | 93.0 |
| $C_{12}H_{25}$ | $CH_3$ | 500 | $10^{-7}$ | 98.9 |
|  |  | 250 | $10^{-7}$ | 97.8 |
|  |  | 125 | $10^{-7}$ | 99.2 |
|  |  | 62.5 | $10^{-7}$ | 98.0 |

Test results obtained are shown in Table 6 with respect to the further class of the test compounds represented by the formula:

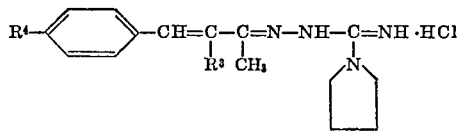

TABLE 6

| R⁴ | R³ | Dosage (mcg./egg) | Virus dilution (EID₅₀:10⁻⁷) | Suppression (percent) of virus multiplication |
|---|---|---|---|---|
| C₈H₁₇O | H | 1,000 | 10⁻⁶ | 96.4 |
|  |  | 500 | 10⁻⁶ | 94.2 |
|  |  | 250 | 10⁻⁶ | 93.6 |

Test results obtained are shown in Table 7 with respect to another class of the test compounds represented by the formula:

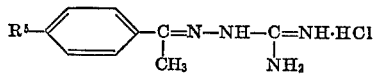

TABLE 7

| R⁵ | Dosage (mcg./egg) | Virus dilution (EID₅₀:10⁻⁷) | Suppression (percent) of virus multiplication |
|---|---|---|---|
| C₈H₁₇O | 200 | 10⁻⁴ | 93.2 |
|  | 200 | 10⁻⁵ | 98.1 |
|  | 200 | 10⁻⁶ | 100.0 |
| C₁₀H₂₁O | 200 | 10⁻⁴ | 98.2 |
|  | 200 | 10⁻⁵ | 92.4 |
|  | 200 | 10⁻⁶ | 95.8 |

(C) TEST OF INHIBITION OF THE MULTIPLICATION OF VIRUS

A solution (0.1 ml.) containing a designated concentration of a test compound which had been diluted with Hanks' balanced salt solution was added 0.8 ml. of Hanks' balanced salt solution containing one piece of chorio-allantoic membrane and one piece of egg shell of 11-day-old embryonated chick eggs. To the mixture was added 0.1 ml. of a suspension of influenza virus A2, Adachi strain, 100 MID₁₀₀/0.1 ml. Shaking culture was carried out at 36° C. for 48 hours. Hemagglutination tests were effected to find out the minimum drug concentration at and above which the virus cultures showed negative reaction to hemagglutinin. The minimum drug concentration determined was regarded as the concentration for inhibition of virus multiplication.

Test results obtained are shown in Table 8 with respect to the class of the test compounds represented by the formula:

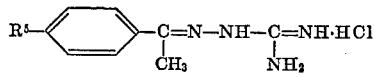

TABLE 8

| R⁵ | Concentration for inhibition of virus multiplication (mcg./ml.) |
|---|---|
| n—C₅H₁₁O | 19 |
| n—C₆H₁₃O | 38 |
| n—C₇H₁₅O | 38 |
| n—C₈H₁₇O | 21 |
| n—C₁₀H₂₁O | 55 |

Test results obtained are shown in Table 9 with respect to the class of the test compounds of the formula:

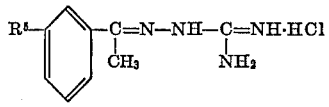

TABLE 9

| R⁵ | Concentration for inhibition of virus multiplication (mcg./ml.) |
|---|---|
| n—C₄H₉O | 14 |
| n—C₅H₁₁O | 10 |
| n—C₆H₁₃O | 14 |
| n—C₇H₁₅O | 13 |
| n—C₈H₁₇O | 29 |
| n—C₁₀H₂₁O | 48 |
| n—C₁₂H₂₅O | 131 |

(D) DETERMINATION OF TOXIC CONCENTRATION TO CHICK EMBRYO

A test compound was serially diluted with Hanks' balanced salt solution to give test solutions each containing a designated concentration of the test compound. 0.1 ml. of the test solution was placed into each incubation tube containing one piece of chorio-allantoic membrane of 11-day-old embryonated chick egg and one piece of egg shell as well as 0.9 ml. of Hanks' balanced salt solution. The tubes were sealed and shaked at 36° C. for 48 hours. The chorio-allantoic membrane was lightly washed with phosphate buffer saline (PBS) and then immersed in a 0.5% Trypan blue PBS solution for 1 to 2 minutes. Subsequently, the membrane was completely washed with the PBS. Such a concentration of the test compound which gave deep blue staining of the membrane after the PBS complete washing was estimated as the toxic concentration of the test compound.

Test results obtained are shown in Table 10 below.

TABLE 10

| Test compounds: | Toxic concentration (mcg./ml.) |
|---|---|
| 3 - methoxy - 4-hydroxybenzalacetone amidinohydrazone hydrochloride | 125 |
| 3-methoxy-4-n-octyloxybenzalacetone amidinohydrazone hydrochloride | 17.5 |
| 3-methoxy-4-n-decyloxybenzalacetone amidinohydrazone hydrochloride | 52.6 |
| 3 - methoxy - 4 - n-lauryloxybenzalacetone amidinohydrazone hydrochloride | 75.0 |

(E) DETERMINATION OF ACUTE TOXICITY IN MICE

The benzalacetone or acetophenone amidinohydrazone derivatives of the present invention exhibit low toxicity to warm blood animals as stated before. This was demonstrated by oral administration of the undermentioned illustrative test compounds to mice and calculating their LD₅₀ values. For comparison, 1-adamantanamine hydrochloride, a known antiviral agent, was tested in the same procedure, too. Test results obtained are shown in Table 11 below.

TABLE 11

| Test compounds: | LD₅₀ mg./kg. |
|---|---|
| Para-decyloxybenzalacetone amidinohydrazone hydrochloride | 2000 |
| 3 - methoxy-4-decyloxybenzalacetone amidinohydrazone hydrochloride | 2500 |
| Metha - dodecyloxybenzalacetone amidinohydrazone hydrochloride | 2000 |
| 1 - adamantanamine hydrochloride (comparative) | 1500 |

(F) TEST FOR DETERMINATION OF THE EFFECT ON EXTENSION OF SURVIVAL OF MICE INFECTED WITH INFLUENZA VIRUS

Three-week-old mice of ICR strain (body weight 9–11 g.) were lightly anesthetized with ethyl ether and then intra-nasally infected with influenza virus (PR8). 3-methoxy-4-decyloxybenzalacetone amidinohydrazone hydrochloride was orally given at a dosage of 37.5 mg./kg. twice a day for a period of 3 days for the treatment. The treated mice were observed for 8 days. Average days of survival of the infected mice were estimated and tabulated below.

TABLE 12

| Test compound: | Average days of survival, days |
|---|---|
| 3 - methoxy-4-decyloxybenzalacetone amidinohydrazone hydrochloride | 6.2 |
| Controls (untreated) | 4.7 |

From the results of the above table it may be observed that the survival of the treated mice was extended by about 1.5 days in average, as compared to the controls. It may be recognised that the survival extension of about 1.5 days should be said a remarkable therapeutic effect of the test compound used, for the young mice tested are normally weak against the influenza virus infections.

(G) TEST FOR DETERMINATION OF THE EFFECT OF INHIBITION TO THE MULTIPLICATION OF PULMONARY INFLUENZA VIRUS IN MICE

Three-week-old mice of ICR strain (body weight 9–11 g.) were lightly anesthetized with ethyl ether and then intra-nasally infected pulmonary influence virus (A/PR8). The under-mentioned illustrative test compounds were each intra-peritoneally injected a day twice at different dosages as indicated below for a period of 3 days after the infection of the virus. For comparison, 1-adamantanamine, the known antiviral agent, was also given at different dosages in the same manner as described above to the control groups of mice. At the end of 72 hours after the infection, the mice were killed and the virus was isolated from the lung in a known manner. Percent of inhibition to the virus multiplication was then estimated by titration of the hemagglutination units in a known manner. The percent of inhibition to the virus multiplication was calculated according to the following equation:

$$\left(1 - \frac{\text{HA titer of test compound-treated group}}{\text{HA titer of control group untreated}}\right) \times 100$$

Test results obtained are summarised in Table 13 below.

The mixture was heated on water bath for 30 minutes under reflux to deposit yellow colored crystals. After cooling the crystals deposited were collected by filtration. Yield 2.4 g. Melting point 228–229° C.

Recrystallisation from diluted aqueous ethanol gave 1.9 g. (yield 70.4%) of yellow colored needles of M.P. 229–230° C., which was identified as 3,4-dihydroxybenzalacetone amidinohydrazone hydrochloride.

*Elementary analysis.*—Calculated (percent): C, 48.80; H, 5.58; N, 20.70. Found (percent): C, 48.80; H, 5.69; N, 20.55.

Example 2.—Production of 3-methoxy-4-hydroxybenzalacetone amidinohydrazone hydrochloride Into 30 ml. of ethanol were taken 1.9 g. ($\frac{1}{100}$ mol) of 3-methoxy-4-hydroxybenzalacetone and 1.4 g. ($\frac{1}{100}$ mol) of aminoguanidine bicarbonate. The solution was acidified by adding dropwise concentrated hydrochloric acid under agitation.

After the mixture was heated for 30 minutes under reflux, it was cooled down to deposit yellow colored crystalline product which was subsequently filtered out. Yield 2.5 g. (91.9%). Melting point 220–222° C. Recrystallisation of this product from ethanol gave 2.1 g. (yield 73%) of lightly yellow colored needles of M.P. 214–216° C., which was identified as 3-methoxy-4-hydroxybenzalacetone amidinohydrazone hydrochloride.

*Elementary analysis.*—Calculated (percent): C, 50.62; H, 6.02; N, 19.68. Found (percent): C, 50.51; H, 6.22; N, 19.52.

Example 3.—Production of 3,4-dimethoxybenzalacetone amidinohydrazone hydrochloride Into 15 ml. of methanol were taken 2 g. ($\frac{1}{100}$ mol) of 3,4-dimethoxybenzalacetone and 1.4 g. ($\frac{1}{100}$ mol) of

TABLE 13

| Test compounds | Percent of Inhibition at daily dosages | | | | |
|---|---|---|---|---|---|
| | 2×5, mg./kg. | 2×10, mg./kg. | 2×50, mg./kg. | 2×100, mg./kg. | 2×150, mg./kg. |
| 3-methoxy-4-decyloxybenzalacetone amidinohydrazone hydrochloride | 53.4 | 92.0 | | | |
| p-Decyloxybenzalacetone amidinohydrazone hydrochloride | | 53.9 | | | |
| m-Dodecyloxybenzalacetone amidinohydrazone hydrochloride | 37.6 | 69.7 | | | |
| 1-adamantanamine hydrochloride (comparative) | | | 47.0 | 63.4 | 81.0 |

From the results of the above tables it is clear that the benzalacetone or acetophenone amidinohydrazone derivatives of the present invention are effective and useful as the antiviral agent for the therapeutic treatment of influenza virus infections. According to a third aspect of the present invention, therefore, there is provided a method of treating influenza virus infections, which comprises administering an effective dosage of benzalacetone or acetophenone amidinohydrazone derivative of the above General Formula I and more particularly of the Formula II, III or IV to the infected host.

The preparation of the benzalacetone or acetophenone amidinohydrazone derivatives of the present invention is now illustrated by the following examples but the present invention is not limited to these examples.

Example 1.—Production of 3,4-dihydroxybenzalacetone amidinohydrazone hydrochloride To 20 ml. of methanol were added 1.8 g. ($\frac{1}{100}$ mol) of 3,4-dihydroxybenzalacetone and 1.4 g. ($\frac{1}{100}$ mol) of aminoguanidine bicarbonate. The mixture was made acidic by adding dropwise concentrated hydrochloric acid with agitation.

aminoguanidine bicarbonate, and the solution was acidified by adding dropwise concentrated hydrochloric acid under agitation.

After the mixture was heated on water bath for 30 minutes under reflux, it was cooled down to deposit yellow colored crystalline product which was then filtered out. Yield 2.8 g. Recrystallisation of this product from methanol gave 1.8 g. (yield 60%) of lightly yellow colored needles of M.P. 209–210° C., which was identified as the desired product.

*Elementary analysis.*—Calculated (percent): C, 52.26; H, 6.41; N, 18.75. Found (percent): C, 52.49; H, 6.51; N, 19.05.

Example 4.—Production of 3-methoxy-4-n-hexyloxybenzalacetone amidinohydrazone hydrochloride Into 10 ml. of methanol were taken 2.8 g. ($\frac{1}{100}$ mol) of 3-methoxy-4-n-hexyloxybenzalacetone and 1.4 g. ($\frac{1}{100}$ mol) of aminoguanidine bicarbonate, and the solution was acidified by adding dropwise concentrated hydrochloric acid under agitation. The mixture was heated for 30 minutes under reflux, and then the solvent was distilled off under reduced pressure. The residual yellow colored crystals were added with ethyl ether and mixed together well. The crystals which remained undissolved were collected by filtration. Yield 3.5 g. Melting point 183–185° C. Recrystallisation of this crystalline product from methanol gave 2.9 g. (yield 78.4%) of yellow colored columnar crystals of M.P. 185–187° C. which were identified as 3-methoxy-4-n-hexyloxybenzalacetone amidinohydrazone hydrochloride.

Elementary analysis.—Calculated (percent): C, 58.61; H, 7.92; N, 15.19. Found (percent): C, 58.58; H, 7.95; N, 15.23.

Example 5.—Production of 3-methoxy-4-n-octyloxybenzalacetone amidinohydrazone hydrochloride Into 10 ml. of ethanol were taken 1.5 g. (1/200 mol) of 3-methoxy-4-n-octyloxybenzalacetone and 0.7 g. (1/200 mol) of aminoguanidine bicarbonate, and the solution was acidified by adding dropwise concentrated hydrochloric acid under agitation. The mixture was heated for 30 minutes under reflux and then the solvent was distilled off under reduced pressure. Ethyl ether was added to the residual yellow colored crystals and well triturated together. The insoluble crystals which remained were collected by filtration. Yield 1.7 g. Melting point 167–168° C. When this crystalline product was recrystallised from methanol, there were obtained 1.4 g. (yield 70%) of faintly yellow tinged needles of M.P. 171–172° C., which was identified as the desired product.

Elementary analysis.—Calculated (percent): C, 60.51; H, 8.38; N, 14.11. Found (percent): C, 60.72; H, 8.56; N, 14.09.

Example 6.—Production of 3,4-di-n-octyloxybenzalacetone amidinohydrazone hydrochloride Into 15 ml. of ethanol were taken 2 g. (1/200 mol) of 3,4-di-n-octyloxybenzalacetone and 0.7 g. (1/200 mol) of aminoguanidine bicarbonate, and the solution was acidified by adding dropwise concentrated hydrochloric acid thereto under agitation. The solution was heated for 30 minutes under reflux, and then the solvent was distilled off under reduced pressure. The residual yellow colored crystalls was added with ethyl ether and well triturated together. The insoluble crystals which remained were collected by filtration. Yield 2.1 g. Melting point was indefinite, as this product reduced its volume in the vicinity of 68° C. and fused near 145° C. to give an opaque appearance.

When this crystalline product was recrystallised from ethanol, there were obtained 1.5 g. (yield 60%) of faintly yellow colored needles of M.P. 150–154° C. which was identified as the desired compound.

Elementary analysis.—Calculated (percent): C, 65.49; H, 9.57; N, 11.32. Found (percent): C, 65.60; H, 9.71; N, 11.50.

Example 7.—Production of 3-methoxy-4-n-decyloxybenzalacetone amidinohydrazone hydrochloride Into 10 ml. of ethanol were taken 1.7 g. (1/200 mol) of 3-methoxy-4-n-decyloxybenzalacetone and 0.7 g. (1/200 mol) of aminoguanidine bicarbonate, and the resulting solution was acidified by adding dropwise concentrated hydrochloric acid thereto under agitation. After the solution was heated for 30 minutes under reflux, the solvent was distilled off under reduced pressure to give crystals of yellowish brown color as the residue. This crystalline product was well triturated together with ethyl ether added, and the insoluble crystals which remained were collected by filtration. Yield 1.6 g.

When the crystals were recrystallized from methanol, there were obtained 1.5 g. (yield 71.4%) of faintly yellow colored needles of M.P. 151–154° C., which was then identified as the desired 3-methoxy-4-n-decyloxybenzalacetone amidinohydrazone hydrochloride.

Elementary analysis.—Calculated (percent): C, 62.17; H, 8.77; N, 13.18. Found (percent): C, 62.19; H, 8.91; N, 13.11.

Example 8.—Production of 3-methoxy-4-n-lauryloxybenzalacetone amidinohydrazone hydrochloride Into 10 ml. of ethanol were taken 1.8 g. (1/200 mol) of 3-methoxy-4-n-lauryloxybenzalacetone and 0.7 g. (1/200 mol) of aminoguanidine bicarbonate, and the resulting solution was acidified by dropwise addition of concentrated hydrochloric acid under agitation. After the solution was heated for 30 minutes under reflux, the solvent was distilled off under reduced pressure. The residual yellow colored crystals were well triturated together with ethyl ether added, and the insoluble crystals which remained were collected by filtration. Yield 2.2 g. Melting point 112° C. (with decomposition).

When this crystalline product was recrystallised from methanol, there were given 1.8 g. (yield 78.3%) of faintly yellow colored crystals of M.P. 150–152° C. which was identified as the desired product.

Elementary analysis.—Calculated (percent): C, 63.62; H, 9.21; N, 12.37. Found (percent): C, 63.59; H, 9.24; N, 12.22.

Example 9.—Production of 3,4-di-n-lauryloxybenzalacetone amidinohydrazone hydrochloride Into 40 ml. of ethanol were taken 1.7 g. (1/300 mol) of 3,4-di-n-lauryloxybenzalacetone and 0.45 g. (1/300 mol) of aminoguanidine bicarbonate, and the solution was acidified by dropwise addition of concentrated hydrochloric acid under agitation. After the solution was heated for 30 minutes under reflux, the solvent was distilled off under reduced pressure. The residual yellow colored crystals were well triturated together with ethyl ether added, and the remaining insoluble crystals were collected by filtration. Yield 2.6 g. This crystalline product exhibited indefinite melting point, as it began to fuse in the vicinity of 100° C. and seemed to melt almost completely in the vicinity of 180° C. but with an opaque appearance. Recrystallisation of this product from ethanol gave 1.2 g. (yield 66.7%) of faintly yellow colored needles of M.P. 177–182° C., which was identified as the desired product.

Elementary analysis.—Calculated (percent): C, 69.21; H, 10.46; N, 9.22. Found (percent): C, 69.06; H, 10.75; N, 9.11.

Example 10.—Production of benzalacetone $N^1,N^1$-tetramethylene-amidinohydrazone hydrochloride A catalytic amount of hydrochloric acid was added to a solution of 2.01 g. (0.01 mol) of $N^1,N^1$-tetramethyleneamidinohydrazine di-hydrochloride and 1.46 g. (0.01 mol) of benzalacetone in 15 ml. of ethanol, and the mixture was heated for 1 hour under reflux. After cooling, the crystals deposited were filtered out, washed with a small volume of ethanol and dried to give 2.21 g. (yield 75%) of yellow colored crystals of M.P. 264–266° C. Recrystallisation of this product from an aqueous solution of 17% ethanol gave a faintly yellow colored powdery product of M.P. 265.5–266.5° C., which was identified as the desired product.

Elementary analysis.—Calculated for $C_{15}H_{21}N_4Cl$ (percent): C, 61.53; H, 7.23; N, 19.14. Found (percent): C, 61.36; H, 7.19; N, 19.11.

Example 12.—Production of p-nitrobenzalacetone $N^1,N^1$-tetramethyleneamidinohydrazone hydrochloride The reaction was carried out in the same manner as in Example 10 except that an equi-molar proportion of p-nitrobenzalacetone was used in place of the benzalacetone. The desired product was obtained in the form of yellow colored platelets of M.P. 213–213.5° C. (recrystallised from ethanol) at yield of 71%.

*Elementary analysis.*—Calculated for $C_{15}H_{20}O_2N_5Cl$ (percent): C, 53.33; H, 5.97; N, 20.73. Found (percent): C, 53.23; H, 5.80; N, 20.58.

Example 13.—Production of α-methylbenzalacetone $N^1,N^1$-tetramethyleneamidinohydrazone hydrochloride The reaction was carried out in the same manner as in Example 10 except that the benzalacetone was replaced by an equi-molar proportion of α-methylbenzalacetone. The desired product was then obtained in the form of a colorless pulver of M.P. 238–239.5° C. (with decomposition) (recrystallised from ethanol) at yield of 74%.

*Elementary analysis.*—Calculated for $C_{10}H_{23}N_4Cl$ (percent): C, 62.63; H, 7.56; N, 18.26. Found (percent): C, 62.31; H, 7.57; N, 18.29.

Example 14.—Production of p - hydroxybenzalacetone $N^1,N^1$-tetramethyleneamidinohydrazone hydrochloride Into 7 ml. of ethanol were taken 0.81 g. (0.005 mol) of p-hydroxybenzalacetone and 0.83 g. (0.005 mol) of $N^1,N^1$-tetramethyleneamidinohydrazine di-hydrochloride, and the solution was added with a catalytic amount of hydrochloric acid. The mixture was heated for 1 hour under reflux. After cooling, the crystals deposited were filtered out from the reaction mixture, washed with a small volume of anhydrous ethanol and dried to give 1.30 g. (yield 84%) of a yellow colored powdery product of M.P. 270–270.5° C. Recrystallisation from an aqueous solution of 85% ethanol gave a lightly yellow colored powder of M.P. 271–271.5° C.

*Elementary analysis.*—Calculated for $C_{15}H_{21}ON_4Cl$ (percent): C, 58.34; H, 6.85; N, 18.14. Found (percent): C, 58.61; H, 6.64; N, 18.30.

Example 15.—Production of p - methoxybenzalacetone $N^1,N^1$-tetramethyleneamidinohydrazone hydrochloride The reaction was carried out in the same manner as in Example 14 except that the p-hydroxybenzalacetone was replaced by p-methoxybenzalacetone. The desired product was obtained in the form of yellow colored columnar crystals of M.P. 260–261° C. (with decomposition) (recrystallised from ethanol) at yield of 67%.

*Elementary analysis.*—Calculated for $C_{16}H_{23}ON_4Cl$ (percent): C, 59.52; H, 7.18; N, 17.36. Found (percent): C, 59.31; H, 7.33; N, 17.13.

Example 16.—Production of p - ethoxybenzalacetone $N^1,N^1$-tetramethyleneamidinohydrazone hydrochloride The reaction was carried out in the same manner as Example 14 except that the p-hydroxybenzalacetone was replaced by an equi-molar proportion of p-ethoxybenzalacetone. The desired product was obtained in the form of a yellow colored powder of M.P. 250–251° C. (with decomposition) at yield of 92%.

*Elementary analysis.*—Calculated for $C_{17}H_{25}ON_4Cl$ (percent): C, 60.61; H, 7.48; N, 16.63. Found (percent): C, 60.52; H, 7.53; N, 16.68.

Example 17.—Production of p-n-propoxybenzalacetone $N^1,N^1$-tetramethyleneamidinohydrazone hydrochloride The reaction was carried out in the same manner as in Example 14 except that the p-hydroxybenzalacetone was replaced by an equi-molar proportion of p-n-propoxybenzalacetone. The desired product was obtained in the form of yellow colored columnar crystals of M.P. 230–230.5° C. (recrystallised from anhydrous ethanol) at yield of 74%.

*Elementary analysis.*—Calculated for $C_{18}H_{27}ON_4Cl$ (percent): C, 61.61; H, 7.76; N, 15.97. Found (percent): C, 61.71; H, 7.93; N, 15.97.

Example 18.—Production of p-n-butoxybenzalacetone $N^1,N^1$-tetramethyleneamidinohydrazone hydrochloride The reaction was carried out in the same manner as in Example 14 except that the p-hydroxybenzalacetone was replaced by an equi-molar proportion of p-n-butoxybenzalacetone. The desired product was obtained in the form of a lightly yellow colored powder of M.P. 227–228° C. at yield of 83%.

*Elementary analysis.*—Calculated for $C_{19}H_{29}ON_4Cl$ (percent): C, 62.53; H, 8.01; N, 15.36. Found (percent): C, 62.55; H, 8.19; N, 15.46.

Example 19.—Production of p-n-pentyloxybenzalacetone $N^1,N^1$ - tetramethyleneamidinohydrazone hydrochloride The reaction was carried out in the same manner as in Example 14 except that the p-hydroxybenzalacetone was replaced by an equi-molar proportion of p-n-pentyloxybenzalacetone. The desired product was then obtained in the form of a lightly yellow colored powder of M.P. 223–224° C. at yield of 84%.

*Elementary analysis.*—Calculated for $C_{20}H_{31}ON_4Cl$ (percent): C, 63.39; H, 8.25; N, 14.79. Found (percent): C, 62.98; H, 8.19; N, 14.75.

Example 20.—Production of p-n-hexyloxybenzalacetone $N^1,N^1$ - tetramethyleneamidinohydrazone hydrochloride The reaction was carried out in the same manner as in Example 14 except that the p-hydroxybenzalacetone was replaced by an equi-molar proportion of p-n-hexyloxybenzalacetone. The desired product was then obtained in the form of a lightly yellow colored powder of M.P. 221–221.5° C. at yield of 74%.

*Elementary analysis.*—Calculated for $C_{21}H_{33}ON_4Cl$ (percent): C, 64.18; H, 8.46; N, 14.26. Found (percent): C, 64.14; H, 8.34; N, 14.12.

Example 21.—Production of p-n-heptyloxybenzalacetone $N^1,N^1$ - tetramethyleneamidinohydrazone hydrochloride The reaction was carried out in the same manner as in Example 14 except that the p-hydroxybenzalacetone was replaced by an equi-molar proportion of p-n-heptyloxybenzalacetone. The desired product was then obtained in the form of a lightly yellow colored powder of melting point of 215–216° C. at yield of 73%.

*Elementary analysis.*—Calculated for $C_{22}H_{35}ON_4Cl$ (percent): C, 64.92; H, 8.67; N, 13.77. Found (percent): C, 64.90; H, 8.89; N, 13.77.

Example 22.—Production of p-n-octyloxybenzalacetone $N^1,N^1$ - tetramethyleneamidinohydrazone hydrochloride The reaction was carried out in the same manner as in Example 14 except that the p-hydroxybenzalacetone was replaced by an equi-molar proportion of p-n-octyloxybenzalacetone. The desired product was then obtained in the form of a yellow colored powder of M.P. 213–213.5° C. at yield of 77%.

*Elementary analysis.*—Calculated for $C_{23}H_{37}ON_4Cl$ (percent): C, 65.61; H, 8.86; N, 13.31. Found (percent): C, 65.75; H, 8.87; N, 13.15.

Example 23.—Production of p-n-decyloxybenzalacetone $N^1,N^1$ - tetramethyleneamidinohydrazone hydrochloride The reaction was carried out in the same manner as in Example 14 except that the p-hydroxybenzalacetone was replaced by an equi-molar proportion of p-n-decyloxybenzalacetone. The desired product was then obtained in the form of yellow colored plate-like crystals of M.P. 209–209.5° C. (recrystallised from anhydrous ethanol) at yield of 74%.

*Elementary analysis.*—Calculated for $C_{25}H_{41}ON_4Cl$ (percent): C, 66.86; H, 9.20; N, 12.48. Found (percent): C, 66.70; H, 9.55; N, 12.25.

Example 24.—Production of p-hydroxy-α-methylbenzalacetone $N^1,N^1$-tetramethyleneamidinohydrazone hydrochloride The reaction was carried out in the same manner as in Example 14 except that the p-hydroxybenzalacetone was replaced by an equi-molar proportion of p-hydroxy-α-methylbenzalacetone. The desired product was then obtained in the form of lightly yellow colored plate-like crystals of M.P. 223.5–224° C. (recrystallised from methanol) at yield of 75%.

*Elementary analysis.*—Calculated for $C_{16}H_{23}ON_4Cl$ (percent): C, 59.52; H, 7.18; N, 17.36. Found (percent): C, 59.69; H, 7.37; N, 17.15.

Example 25.—Production of p-methoxy-α-methylbenzalacetone $N^1,N^1$-tetramethyleneamidinohydrazone hydrochloride The reaction was carried out in the same manner as in Example 14 except that the p-hydroxybenzalacetone was replaced by an equi-molar proportion of p-methoxy-α-methylbenzalacetone. The desired product was then obtained in the form of colorless plate-like crystals of M.P. 228–228.5° C. (recrystallised from anhydrous ethanol) at yield of 58%.

*Elementary analysis.*—Calculated for $C_{17}H_{25}ON_4Cl$ (percent): C, 60.61; H, 7.48; N, 16.63. Found (percent): C, 60.49; H, 7.58; N, 16.61.

Example 26.—Production of p-ethoxy-α-methylbenzalacetone $N^1,N^1$ - tetramethyleneamidinohydrazone hydrochloride The reaction was carried out in the same manner as in Example 14 except that the p-hydroxybenzalacetone was replaced by an equi-molar proportion of p-ethoxy-α-methylbenzalacetone. The desired product was then obtained in the form of colorless plate-like crystals of M.P. 201–202° C. (with decomposition) (recrystallised from anhydrous ethanol) at yield of 39%.

*Elementary analysis.*—Calculated for $C_{18}H_{27}IN_4Cl$ (percent): C, 61.61; H, 7.76; N, 15.97. Found (percent): C, 61.70; H, 7.70; N, 16.00.

Example 27.—Production of -propoxy-α-methylbenzalacetone $N^1,N^1$-tetramethyleneamidinohydrazone hydrochloride The reaction was carried out in the same manner as in Example 14 except that the p-hydroxybenzalacetone was replaced by an equi-molar proportion of p-propoxy-α-methylbenzalacetone. The desired product was then obtained in the form of colorless plate-like crystals of M.P. 196–197° C. (with decomposition) (recrystallised from anhydrous ethanol) at yield of 84%.

*Elementary analysis.*—Calculated for $C_{19}H_{29}ON_4Cl$ (percent): C, 62.53; H, 8.01; N, 15.36. Found (percent): C, 62.79; H, 8.31; N, 15.03.

Example 28.—Production of p-butoxy-α-methylbenzalacetone $N^1,N^1$-tetramethyleneamidinohydrazone hydrochloride The reaction was carried out in the same manner as in Example 14 except that the p-hydroxybenzalacetone was replaced by an equi-molar proportion of p-butoxy-α-methylbenzalacetone. The desired product was then obtained in the form of colorless plate-like crystals of M.P. 197–199° C. at yield of 87%.

*Elementary analysis.*—Calculated for $C_{20}H_{31}ON_4Cl$ (percent) C, 63.39; H, 8.27; N, 14.79. Found (percent): C, 63.56; H, 8.00; N, 14.87.

Example 29.—Production of p-pentyloxy-α-methylbenzalacetone $N^1,N^1$-tetramethyleneamidinohydrazone hydrochloride The reaction was carried out in the same manner as in Example 14 except that the p-hydroxybenzalacetone was replaced by an equi-molar proportion of p-pentyloxy-α-methylbenzalacetone. The reaction was then obtained in the form of colorless plate-like crystals of M.P. 186–188° C. (with decomposition) (recrystallised from anhydrous ethanol) at yield of 54%.

*Elementary analysis.*—Calculated for $C_{21}H_{33}ON_4Cl$ (percent): C, 64.18; H, 8.46; N, 14.26. Found (percent): C, 64.18; H, 8.84; N, 13.85.

Example 30.—Production of p-hexyloxy-α-methylbenzalacetone $N^1,N^1$-tetramethyleneamidinohydrazone hydrochloride The reaction was carried out in the same manner as in Example 14 except that the p-hydroxybenzalacetone was replaced by an equi-molar proportion of p-hexyloxy-α-methylbenzalacetone. The desired product was then obtained in the form of colorless platelets of M.P. 186–187° C. (with decomposition) at yield of 37%.

*Elementary analysis.*—Calculated for $C_{22}H_{35}ON_4Cl$ (percent): C, 64.92; H, 8.67; N, 13.77. Found (percent): C, 65.32; H, 8.93; N, 13.45.

Example 31.—Production of p-heptyloxy-α-methylbenzalacetone $N^1,N^1$-tetramethyleneamidinohydrazone hydrochloride The reaction was carried out in the same manner as in Example 14 except that the p-hydroxybenzalacetone was replaced by an equi-molar proportion of p-heptyloxy-α-methylbenzalacetone. The desired product was then obtained in the form of colorless platelets of M.P. 186–188° C. (with decomposition), recrystallised from anhydrous ethanol) at yield of 62%.

*Elementary analysis.*—Calculated for $C_{23}H_{37}ON_4Cl$ (percent): C, 65.61; H, 8.86; N, 13.31. Found (percent): C, 65.38; H, 9.10; N, 12.93.

Example 32.—Production of p-octyloxy-α-methylbenzalacetone $N^1,N^1$-tetramethyleneamidinohydrazone hydrochloride The reaction was carried out in the same manner as in Example 14 except that the p-hydroxybenzalacetone was replaced by an equi-molar proportion of p-octyloxy-α-methylbenzalacetone. The desired product was then obtained in the form of colorless platelets of M.P. 190–192° C. (with decomposition) (recrystallised from anhydrous ethanol) at yield of 52%.

*Elementary analysis.*—Calculated for $C_{24}H_{39}ON_4Cl$ (percent): C, 66.26; H, 9.04; N, 12.88. Found (percent): C, 66.69; H, 9.21; N, 12.73.

Example 33.—Production of p-decyloxy-α-methylbenzalacetone $N^1,N^1$-tetramethyleneamidinohydrazone hydrochloride The reaction was carried out in the same manner as in Example 14 except that the p-hydroxybenzalacetone was replaced by an equi-molar proportion of p-decyloxy-α-methylbenzalacetone. The desired product was then obtained in the form of colorless platelets of M.P. 193–194° C. (recrystallised from anhydrous ethanol) at yield of 59%.

*Elementary analysis.*—Calculated for $C_{26}H_{43}ON_4Cl$ (percent): C, 67.43; H, 9.36; N, 12.10. Found (percent): C, 57.67; H, 9.17; N, 12.00.

Example 34.—Production of p-n-dodecyloxybenzalacetone $N^1,N^1$-tetramethyleneamidinohydrazone hydrochloride The reaction was carried out in the same manner as in Example 14 except that the p-hydroxybenzalacetone was replaced by an equi-molar proportion of p-n-dodecyloxybenzalacetone. The desired product was then obtained in the form of a yellow colored powder of M.P. 199–200° C. (recrystallised from ethanol) at yield of 72%.

*Elementary analysis.*—Calculated for $C_{27}H_{45}ON_4Cl$ (percent): C, 67.96; H, 9.51; N, 11.74. Found (percent): C, 67.80; H, 9.80; N, 11.62.

Example 35.—Production of p-n-hexadecyloxybenzalacetone $N^1,N^1$ - tetramethyleneamidinohydrazone hydrochloride The reaction was carried out in the same manner as in Example 14 except that the p-hydroxybenzalacetone was replaced by an equi-molar proportion of p-n-hexadecyloxybenzalacetone. The desired product was then obtained in the form of a yellow colored powder of M.P. 195–196° C. (recrystallised from ethanol) at yield of 70%.

*Elementary analysis.*—Calculated for $C_{31}H_{53}ON_4Cl$ (percent): C, 69.82; H, 10.02; N, 10.51. Found (percent): C, 69.53; H, 10.07; N, 10.38.

Example 36.—Production of p-n-butoxyacetophenone amidinohydrazone hydrochloride

A mixture of 1.92 g. (0.01 mol) of p-n-butoxyacetophenone and 1.36 g. (0.01 mol) of amidinohydrazine bicarbonate in 10 mls. of ethanol was acidified by addition of concentrated hydrochloric acid and then heated on steam bath for 1 hour under reflux. After cooling, the crystals deposited were filtered out to recover 1.29 g. (yield 45%) of colorless platelets of M.P. 185–187° C., which were identified as the desired product. Upon the recrystallisation of this crystalline substance, the melting point did not change.

*Elementary analysis.*—Calculated for $C_{13}H_{21}ON_4Cl$ (percent): C, 54.83; H, 7.43; N, 19.67. Found (percent): C, 55.10; H, 7.36; N, 19.83.

Example 37.—Production of p-n-pentyloxyacetophenone amidinohydrazone hydrochloride The process of Example 36 was followed except that the p-n-butoxyacetophenone was replaced by an equi-molar proportion of p-n-pentyloxyacetophenone. The desired product was then obtained in the form of colorless platelets of M.P. 164–165° C. at yield of 63%.

*Elementary analysis.*—Calculated for $C_{14}H_{23}ON_4Cl$ (percent): C, 56.27; H, 7.76; N, 18.75. Found (percent): C, 56.56; H, 7.54; N, 18.86.

Example 38.—Production of p-n-hexyloxyacetophenone amidinohydrazone hydrochloride The process of Example 36 was followed except that the p-n-butoxyacetophenone was replaced by an equi-molar proportion of p-n-hexyloxyacetophenone. The desired product was then obtained in the form of colorless platelets of M.P. 162–163° C. at yield of 50%.

*Elementary analysis.*—Calculated for $C_{15}H_{25}ON_4Cl$ (percent): C, 57.59; H, 8.05; N, 17.91. Found (percent): C, 57.81; H, 7.97; N, 18.16.

Example 39.—Production of p-n-heptyloxyacetophenone amidinohydrazone hydrochloride The process of Example 36 was followed except that the p-n-butoxyacetophenone was replaced by an equi-molar proportion of p-n-heptyloxyacetophenone. The desired product was then obtained in the form of colorless needles of 133–135° C. at yield of 46%.

*Elementary analysis.*—Calculated for $C_{16}H_{27}ON_4Cl$ (percent): C, 58.79; H, 8.33; N, 17.14. Found (percent): C, 58.51; H, 8.20; N, 17.20.

Example 40.—Production of p-n-octyloxyacetophenone amidinohydrazone hydrochloride The process of Example 36 was followed except that the p-n-butoxyacetophenone was replaced by an equi-molar proportion of p-n-octyloxyacetophenone. The desired product was then obtained in the form of colorless needles of M.P. 131–133° C. at yield of 37%.

*Elementary analysis.*—Calculated for $C_{17}H_{29}ON_4Cl$ (percent): C, 59.89; H, 8.57; N, 16.44. Found (percent): C, 59.90; H, 8.50; N, 16.20.

Example 41.—Production of p-n-decyloxyacetophenone amidinohydrazone hydrochloride The process of Example 36 was followed except that the p-n-butoxyacetophenone was replaced by an equi-molar proportion of p-n-decyloxyacetophenone. The desired product was then obtained in the form of colorless platelets of M.P. 135–137° C. at yield of 22%.

*Elementary analysis.*—Calculated for $C_{19}H_{33}ON_4Cl$ (percent): C, 61.85; H, 9.02; N, 15.19. Found (percent): C, 61.75; H, 9.07; N, 15.36.

Example 42.—Production of m-n-butoxyacetophenone amidinohydrazone hydrochloride

The process of Example 36 was followed except that the p-n-butoxyacetophenone was replaced by an equi-molar proportion of metha-n-butoxyacetophenone. The desired product was then obtained in the form of colorless platelets of M.P. 141–142° C. at yield of 67%.

*Elementary analysis.*—Calculated for $C_{13}H_{21}ON_4Cl$ (percent): C, 54.82; H, 7.43; N, 19.68. Found (percent): C, 54.03; H, 7.52; N, 19.77.

Example 43.—Production of m-n-pentyloxyacetophenone amidinohydrazone hydrochloride The process of Example 36 was followed except that the p-n-butoxyacetophenone was replaced by an equi-molar proportion of m-n-pentyloxyacetophenone. The desired product was then obtained in the form of colorless needles of M.P. 130–131° C. at yield of 55%.

*Elementary analysis.*—Calculated for $C_{14}H_{23}ON_4Cl$ (percent): C, 56.27; H, 7.76; N, 18.75. Found (percent): C, 56.38; H, 7.74; N, 18.87.

Example 44.—Production of m-n-hexyloxyacetophenone amidinohydrazone hydrochloride The process of Example 36 was followed except that the p-n-butoxyacetophenone was replaced by an equi-molar proportion of m-n-hexyloxyacetophenone. The desired product was then obtained in the form of colorless needles of M.P. 140–141° C. at yield of 65%.

*Elementary analysis.*—Calculated for $C_{15}H_{25}ON_4Cl$ (percent): C, 57.59; H, 8.06; N, 17.91. Found (percent): C, 58.00; H, 8.07; N, 18.07.

Example 45.—Production of m-n-heptyloxyacetophenone amidinohydrazone hydrochloride The process of Example 36 was followed except that the p-n-butoxyacetophenone was replaced by an equi-molar proportion of m-n-heptyloxyacetophenone. The desired product was then obtained in the form of colorless needles of M.P. 132–132.5° C. at yield of 65%.

*Elementary analysis.*—Calculated for $C_{16}H_{27}ON_4Cl$ (percent): C, 58.79; H, 8.33; N, 17.14. Found (percent): C, 59.06; H, 8.33; N, 17.15.

Example 46.—Production of m-n-octyloxyacetophenone amidinohydrazone hydrochloride The process of Example 36 was followed except that the n-p-butoxyacetophenone was replaced by an equi-molar proportion of m-n-octyloxyacetophenone. The desired product was then obtained in the form of colorless needles of M.P. 136–137° C. at yield of 62%.

*Elementary analysis.*—Calculated for $C_{17}H_{29}ON_4Cl$ (percent): C, 59.89; H, 8.58; N, 16.44. Found (percent): C, 60.26; H, 8.34; N, 16.51.

Example 47.—Production of m-n-decyloxyacetophenone amidinohydrazone hydrochloride The process of Example 36 was followed except that the p-n-butoxyacetophenone was replaced by an equimolar proportion of m-n-decyloxyacetophenone. The desired product was then obtained in the form of colorless needles of M.P. 132–132.5° C. at yield of 65%.

*Elementary analysis.*—Calculated for $C_{19}H_{33}ON_4Cl$ (percent): C, 61.85; H, 9.02; N, 15.19. Found: (percent): C, 62.48; H, 8.96; N, 15.16.

Example 48.—Production of m-n-dodecyloxyacetophenone amidinohydrazone hydrochloride The process of Example 36 was followed except that the p-n butoxyacetophenone was replaced by an equi-molar production of m-n-dodecyloxyacetophenone. The desired product was then obtained in the form of colorless needles of M.P. 129.5–130.5° C. at yield of 44%.

*Elementary analysis.*—Calculated for $C_{21}H_{37}ON_4Cl$ (percent): C, 63.53; H, 9.39; N, 14.11. Found (percent): C, 63.77; H, 9.41; N, 14.30.

Example 49.—Production of m-n-hexadecyloxyacetophenone amidinohydrazone hydrochloride The process of Example 36 was followed except that the the p-n-butoxyacetophenone was replaced by an equi-molar proportion of m-n-hexadecyloxyacetophenone. The desired product was then obtained in the form of colorless needles of M.P. 129.5–130.5° C. at yield of 70%.

*Elementary analysis.*—Calculated for $C_{25}H_{45}ON_4Cl$ (percent): C, 66.27; H, 10.00; N, 12.37. Found (percent): C, 66.51; H, 9.69; N, 12.13.

Example 50.—Production of o-n-butoxyacetophenone amidinohydrazone hydrochloride The process of Example 36 was folowed except that the p-n-butoxyacetophenone was replaced by an equi-molar proportion of o-n-butoxyacetophenone. The desired product was then obtained in the form of a white colored powder of M.P. 167.5–169° C. (recrystallised from acetone-ethyl ether) at yield of 40%.

*Elementary analysis.*—Calculated for $C_{13}H_{21}ON_4Cl$ (percent): C, 54.82; H, 7.43; N, 19.67. Found (percent): C, 54.57; H, 7.43; N, 19.27.

Example 51.—Production of o-n-decyloxyacetophenone amidinohydrazone hydrochloride The process of Example 36 was followed except that the p-n-butoxyacetophenone was replaced by an equi-molar proportion of o-n-decyloxyacetophenone. The desired product was then obtained in the form of a lightly yellow colored solid of M.P. 82–85° C. (recrystallised from methanol) at yield of 40%.

*Elementary analysis.*—Calculated for $C_{19}H_{33}ON_4Cl$ (percent): C, 61.85; H, 9.02; N, 15.19. Found (percent): C, 61.73; H, 8.99; N, 15.20.

Example 52.—Production of p-methoxyacetophenone $N^1,N^1$-tetramethyleneamidinohydrazone hydrochloride A catalytic amount of hydrochloric acid was added to a mixture of 1.50 g. (0.01 mol) of p-methoxyacetophenone and 2.01 g. (0.01 mol) of $N^1,N^1$-tetramethyleneamidinohydrazine di-hydrochloride in 15 ml. of ethanol, which was subsequently heated for 1 hour under reflux. After cooling, the crystals deposited were filtered out, washed with ethanol and dried to give 2.85 g. (yield 96%) of the desired product in the form of colorless needles of M.P. 251–252° C.

*Elementary analysis.*—Calculated for $C_{14}H_{21}ON_4Cl$ (percent): C, 56.65; H, 7.13; N, 18.88. Found (percent): C, 56.66; H. 7.19; N, 18.88.

Example 53.—Production of acetophenone $N^1,N^1$-tetramethyleneamidinohydrazone hydrochloride The process of Example 52 was repeated except that the p-methoxyacetophenone was replaced by an equimolar proportion of acetophenone. The desired product was then obtained in the form of a lightly yellow colored powder of M.P. 263–263.5° C. at yield of 57%.

*Elementary analysis.*—Calculated for $C_{13}H_{19}N_4Cl$ (percent): C, 58.53; H, 7.18; N, 21.00. Found (percent): C, 58.42; H, 7.19; N, 21.11.

Example 54.—Production of p-nitroacetophenone $N^1,N^1$-tetramethyleneamidinohydrazone hydrochloride The process of Example 52 was repeated except that the p-methoxyacetophenone was replaced by an equimolar proportion of p-nitroacetophenone. The desired product was then obtained in the form of yellow colored platelets of M.P. 233–233.5° C. (recrystallised from ethanol) at yield of 90%.

*Elementary analysis.*—Calculated for $C_{13}H_{18}O_2N_5Cl$ (percent): C, 50.08; H, 5.87; N, 22.46. Found (percent): C, 50.24; H, 5.63; N, 22.35.

Example 55.—Production of p-n-butoxyacetophenone $N^1,N^1$-tetramethyleneamidinohydrazone hydrochloride The process of Example 52 was repeated except that the p-n-methoxyacetophenone was replaced by an equimolar proportion of p-n-butoxyacetophenone. The desired product was then obtained in the form of colorless platelets of M.P. 237–238° C. (recrystallised from ethanol) at yield of 45%.

*Elementary analysis.*—Calculated for $C_{17}H_{27}ON_4Cl$ (percent): C, 60.25; H, 8.03; N, 16.53. Found (percent): C, 60.16; H, 7.89; N, 16.80.

Example 56.—Production of p-n-pentyloxyacetophenone $N^1,N^1$-tetramethyleneamidinohydrazone hydrochloride The process of Example 52 was repeated except that the p-n-methoxyacetophenone was replaced by an equimolar proportion of p-n-pentyloxyacetophenone. The desired product was then obtained in the form of colorless platelets of M.P. 240–241° C. at yield of 69%.

*Elementary analysis.*—Calculated for $C_{18}H_{29}ON_4Cl$ (percent): C, 61.26; H, 8.28; N, 15.88. Found (percent): C, 60.98; H, 8.20; N, 16.11.

Example 57.—Production of p-n-hexyloxyacetophenone $N^1,N^1$-tetramethylenediaminohydrazone hydrochloride The process of Example 52 was repeated except that the p-methoxyacetophenone was replaced by an equimolar proportion of p-n-hexyloxyacetophenone. The desired product was similarly obtained in the form of colorless platelets of M.P. 231–232° C. at yield of 60%

*Elementary analysis.*—Calculated for $C_{19}H_{31}ON_4Cl$ (percent): C, 62.20; H, 8.52; N, 15.27. Found (percent): C, 62.17; H, 8.64; N, 15.02.

Example 58.—Production of p-n-decyloxyacetophenone $N^1,N^1$-tetramethyleneamidinohydrazone hydrochloride The process of Example 52 was repeated except that the p-methoxyacetophenone was replaced by an equimolar proportion of p-n-decyloxyacetophenone. The desired product was similarly obtained in the form of colorless platelets of M.P. 212–214° C. at yield of 74%.

*Elementary analysis.*—Calculated for $C_{23}H_{39}ON_4Cl$ (percent): C, 65.30; H, 9.29; N, 13.24. Found (percent): C, 65.44; H, 9.20; N, 13.05.

Example 59.—Production of p-n-butoxyacetophenone $N^1,N^1$-pentamethyleneamidinohydrazone hydrochloride A mixture of 1.92 g. (0.01 mol) of p-n-butoxyacetophenone and 2.15 g. (0.01 mol) of $N^1,N^1$-pentamethyleneamidinohydrazine dihydrochloride in 10 ml. of ethanol was heated for 1 hour under reflux in the presence of hydrochloric acid catalyst. After cooling, 20 ml. of ethyl ether was added to the reaction mixture to deposit the crystals which were then filtered out. The desired product was obtained at yield of 2.17 g. (66%) in the form of colorless platelets of M.P. 189–191° C.

Elementary analysis.—Calculated for $C_{18}H_{29}ON_4Cl$ (percent): C. 61.26; H, 8.28; N, 15.88. Found (percent): C, 61.40; H, 8.21; N, 16.01.

Example 60.—Production of p-n-pentyloxyacetophenone $N^1,N^1$-pentamethyleneamidinohydrazone hydrochloride The process of Example 59 was followed except that the p-n-butoxyacetophenone was replaced by p-n-pentyloxyacetophenone. The desired product was similarly obtained in the form of colorless platelets of M.P. 179–181° C. at yield of 80%.

Elementary analysis.—Calculated for $C_{19}H_{31}ON_4Cl$ (percent): C, 62.19; H, 8.52; N, 15.27. Found (percent): C, 62.33; H, 8.53; N, 15.48.

Example 61.—Production of p-n-hexyloxyacetophenone $N^1,N^1$-pentamethyleneamidinohydrazone hydrochloride The process of Example 59 was followed except that the p-n-butoxyacetophenone was replaced by p-n-hexyloxyacetophenone. The desired product was similarly obtained in the form of a white colored powder of M.P. 178–179° C. at yield of 43%.

Elementary analysis.—Calculated for $C_{20}H_{33}ON_4Cl$ (percent): C, 63.06; H, 8.73; N, 14.71. Found (percent): C, 62.90; H, 8.74; N, 14.86.

Example 62.—Production of p-n-decyloxyacetophenone $N^1,N^1$-pentamethyleneamidinohydrazone hydrochloride The process of Example 59 was followed except that the p-n-butoxyacetophenone was replaced by p-n-decyloxyacetophenone. The desired product was then similarly obtained in the form of a white colored powder of M.P. 151–152° C. at yield of 27%.

Elementary analysis.—Calculated for $C_{24}H_{41}ON_4Cl$ (percent): C, 65.95; H, 9.46; N, 12.82. Found (percent): C, 65.95; H, 9.48; N, 13.11.

Example 63.—Production of p-n-butoxyacetophenone $N^1,N^1$-anhydro-bis(2-hydroxyethyl)-amidinohydrazone A mixture of 1.92 g. (0.01 mol) of p-n-butoxyacetophenone and 1.80 g. (0.01 mol) of $N^1,N^1$-anhydro-bis(2-hydroxyethyl)-amidinohydrazine hydrochloride in 10 ml. of ethanol was heated 1 hour under reflux. The reaction mixture was then treated with sodium hydroxide in a known manner to give the desired product as colorless needles of M.P. 118–119° C. (recrystallised from ethanol) at yield at 41%.

Elementary analysis.—Calculated for $C_{17}H_{26}O_2N_4$ (percent): C, 64.12; H, 8.23; N, 17.60. Found (percent): C, 64.30; H, 8.25; N, 17.50.

Example 64.—Production of p-n-pentyloxyacetophenone $N^1,N^1$-anhydro-bis(2 - hydroxyethyl) - amidinohydrazone The process of Example 63 was repeated except that the p-n-butoxyacetophenone was replaced by p-n-pentyloxyacetophenone. The desired product was then similarly obtained in the form of colorless needles of M.P. 111–113° C. at yield of 76%.

Elementary analysis.—Calculated for $C_{18}H_{28}O_2N_4$ (percent): C, 65.03; H, 8.49; N, 16.85. Found (percent): C, 65.28; H, 8.24; N, 17.00.

Example 65.—Production of p-n-hexyloxyacetophenone $N^1,N^1$-anhydro-bis(2 - hydroxyethyl) - amidinohydrazone The process of Example 63 was repeated except that the p-n-butoxyacetophenone was replaced by p-n-hexyloxyacetophenone. The desired product was then similarly obtained in the form of colorless needles of M.P. 104–106° C. at yield of 73%.

Elementary analysis.—Calculated for $C_{19}H_{30}O_2N_4$ (percent): C, 65.86; H, 8.73; N, 16.17. Found (percent): C, 65.63; H, 8.48; N, 16.23.

Example 66.—Production of p-n-decyloxyacetophenone $N^1,N^1$-anhydro-bis(2 - hydroxyethyl) - amidinohydrazone The process of Example 63 was repeated except that the p-n-butoxyacetophenone was replaced by p-n-decyloxyacetophenone. The desired product was then similarly obtained in the form of colorless needles of M.P.109–110° C. at yield of 73%.

Elementary analysis.—Calculated for $C_{23}H_{38}O_2N_4$ (percent): C, 68.62; H, 9.51; N, 13.92. Found (percent): C, 68.91; H, 9.70; N, 14.14

Example 67.—Production of p-n-butoxyacetophenone $N^1,N^1$-anhydro-bis(2 - hydroxyethyl) - amidinohydrazone hydrochloride The product of Example 66 in the form of free base was dissolved in chlorofrom. Gaseous hydrogen chloride was then bubbled through the solution to give the desired hydrochloride in the form of colorless needles of M.P. 156–157° C.

Elementary analysis.—Calculated for $C_{17}H_{27}O_4N_2Cl$ (percent): C, 57.53; H, 7.67; N, 15.79. Found (percent): C, 56.76; H, 7.66; N, 15.96.

Example 68.—Production of p-n-pentyloxyacetophenone $N^1,N^1$-anhydro-bis(2 - hydroxyethyl) - amidinohydrazone hydrochloride The product of Example 64 as the free base form was dissolved in chloroform and then gaseous hydrogen chloride was bubbled through the solution. The desired hydrochloride was yielded in the form of colorless needles of M.P. 147–148° C.

Elementary analysis.—Calculated for $C_{18}H_{29}O_2N_4Cl$ (percent): C, 58.60; H, 7.92; N, 15.19. Found (percent): C, 58.31; H, 7.94; N, 14.91.

Example 69.—Production of p-n-hexyloxyacetophenone $N^1,N^1$-anhydro - bis(2-hydroxyethyl) - amidinohydrazone hydrochloride The product of Example 65 as the free base form was dissolved in chloroform and gaseous hydrogen chloride was then passed through the solution to give the desired hydrochloride in the form of colorless needles of M.P. 153–154° C.

Elementary analysis.—Calculated for $C_{19}H_{31}O_2N_4Cl$ (percent): C, 59.59; H, 8.16; N, 14.63. Found (percent): C, 59.57; H, 8.19; N, 14.50.

Example 70.—Production of p-n-decyloxyacetophenone $N^1,N^1$-anhydro - bis(2-hydroxyethyl) - amidinohydrazone hydrochloride The product of Example 66 as the free base form was dissolved in chloroform and gaseous hydrogen chloride was then passed through the solution to yield the desired hydrochloride in the form of colorless needles of M.P. 154–155° C.

Elementary analysis.—Calculated for $C_{23}H_{39}O_2N_4Cl$ (percent): C, 62.92; H, 8.95; N, 12.76. Found (percent): C, 62.69; H, 8.86; N, 12.55.

We claim:
1. 3-methoxy-4-decyloxybenzalacetone amidinohydrazone and its hydrochloride.

References Cited
FOREIGN PATENTS

| | | | |
|---|---|---|---|
| 1,857 | 2/1966 | Japan | 260—564 F |
| 2,046,824 | 12/1970 | France | 260—564 |

OTHER REFERENCES

Jeney et al.: Chemical Abstracts, vol. 65, col. 2670 (1966) (abstract of Zentr. Bakteriol. Parasitenk, Abt. I, Orig. 199, pp. 109–112 (1966)).

Jeney et al.: Chemical Abstracts, vol. 71, abstract No. 79634 (1969) (abstract of Jeney et al., Zentrabl. Bakterial. Parasitenk. Infektionskr. Hyg., Abt., orig. 1969, vol. 210, pp. 107–114).

Maeda et al.: Chemical Abstracts, vol. 69, abst. No. 273910 (1968) (abst. of Yakugaku Zasshi, vol. 86, pp. 1509 to 1513, 1967).

Chemical Abstracts, vol. 64, col. 15802 (1966) (abstract of Japanese Pat. 1857).

JOHN D. RANDOLPH, Primary Examiner

U.S. Cl. X.R.

424—267, 274, 326; 260—240 G, 326.86, 590, 592